(12) United States Patent
Wechs

(10) Patent No.: US 10,018,252 B2
(45) Date of Patent: Jul. 10, 2018

(54) DOUBLE-CLUTCH GEARBOX OF COUNTERSHAFT DESIGN

(71) Applicant: ZF Friedrichshafen AG, Friedrichshafen (DE)

(72) Inventor: Michael Wechs, Weißensberg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 137 days.

(21) Appl. No.: 15/103,855

(22) PCT Filed: Nov. 11, 2014

(86) PCT No.: PCT/EP2014/074215
§ 371 (c)(1),
(2) Date: Jun. 11, 2016

(87) PCT Pub. No.: WO2016/086236
PCT Pub. Date: Jun. 18, 2015

(65) Prior Publication Data
US 2016/0312857 A1    Oct. 27, 2016

(30) Foreign Application Priority Data

Dec. 11, 2013   (DE) .......................  10 2013 225 527

(51) Int. Cl.
*F16H 3/093*      (2006.01)
*F16H 3/00*       (2006.01)
(Continued)

(52) U.S. Cl.
CPC ............ *F16H 3/093* (2013.01); *F16H 3/006* (2013.01); *F16H 3/54* (2013.01); *F16H 37/04* (2013.01);
(Continued)

(58) Field of Classification Search
CPC . F16H 3/093; F16H 3/54; F16H 37/04; F16H 3/006; F16H 2200/2005;
(Continued)

(56) References Cited

U.S. PATENT DOCUMENTS 7,311,630 B2   12/2007  Borgerson
8,075,436 B2   12/2011  Bachmann
(Continued)

FOREIGN PATENT DOCUMENTS

DE    102006058831 A1    7/2007
DE    102006059591 A1    6/2008
(Continued)

OTHER PUBLICATIONS

German Search Report, DE102013225527.6, dated Nov. 19, 2015. (8 pages).
(Continued)

*Primary Examiner* — David J Hlavka
(74) *Attorney, Agent, or Firm* — Dority & Manning, P.A.

(57) ABSTRACT

A dual-clutch transmission includes four gear levels, which form discrete spur gear transmission ratio stages. A planetary gear set is connected or connectable to one of a first input shaft and a second input shaft. The planetary gear set is connected or connectable to one of the four gear levels such that at least a first forward gear and a second forward gear are shiftable as winding path gears with a simultaneous load switching capability of at least the first three forward gears.

14 Claims, 3 Drawing Sheets

(51) Int. Cl.
*F16H 3/54* (2006.01)
*F16H 37/04* (2006.01)
*B60K 6/54* (2007.10)

(52) U.S. Cl.
CPC ........ *B60K 6/54* (2013.01); *F16H 2003/0931* (2013.01); *F16H 2200/006* (2013.01); *F16H 2200/0091* (2013.01); *F16H 2200/2005* (2013.01)

(58) Field of Classification Search
CPC ....... F16H 2200/0091; F16H 2200/006; F16H 2003/0931; B60K 6/54
See application file for complete search history.

(56) References Cited

U.S. PATENT DOCUMENTS

| | | |
|---|---|---|
| 9,145,960 B2 | 9/2015 | Phillips |
| 9,409,473 B2 | 8/2016 | Kaltenbach et al. |
| 2003/0148847 A1 | 8/2003 | Kawamoto et al. |
| 2010/0206105 A1 | 8/2010 | Rieger |
| 2010/0269611 A1 | 10/2010 | Rieger |
| 2012/0004063 A1* | 1/2012 | Koyama ................. B60K 6/36 475/5 |
| 2013/0324362 A1* | 12/2013 | Lee ....................... B60W 20/30 477/5 |
| 2014/0305239 A1 | 10/2014 | Lubke et al. |
| 2014/0338497 A1 | 11/2014 | Michel et al. |
| 2015/0260268 A1* | 9/2015 | Minaminakamichi .. F16D 23/02 475/5 |
| 2015/0321545 A1* | 11/2015 | Park ....................... B60W 20/30 475/5 |
| 2015/0321662 A1* | 11/2015 | Park ........................ B60K 6/48 475/5 |

FOREIGN PATENT DOCUMENTS

| | | |
|---|---|---|
| DE | 102007049265 A1 | 4/2009 |
| DE | 102007049269 A1 | 4/2009 |
| DE | 102008031456 A1 | 1/2010 |
| DE | 102008036165 A1 | 2/2010 |
| DE | 102011085199 A1 | 5/2013 |
| DE | 102011088396 A1 | 6/2013 |
| DE | 102013223356 A1 | 5/2015 |
| DE | 102014118088 A1 | 6/2015 |
| WO | WO 2013/087435 A1 | 6/2013 |

OTHER PUBLICATIONS

International Search Report (English Translation) PCT/EP2014/074215, dated Feb. 10, 2015. (2 pages).

* cited by examiner

| Gear | K1 | K2 | S1 | S2 | S3 | S4 | S5 | S6 | S7 | S8 | S9 | S10 |
|---|---|---|---|---|---|---|---|---|---|---|---|---|
| 1 | X | | | | X | | X | | | X | | |
| 2 | | X | | | X | | | | | X | | |
| 3 | X | | | | X | | | X | | | | |
| 4 | | X | | | | | | X | | | | |
| 5 | X | | | | | | | X | | | X | |
| 6 | | X | X | | | | | | | | | |
| 7 | X | | | | | | | | | | | X |
| 8 Capable of load switching for 7 | | X | | X | | | | X | | | | X |
| 8 Not Capable of load switching for 7 | X | | X | | | | | X | | X | | |
| R1 | X | | | | | X | | | | | | |
| R2 | | X | | | | X | X | | X | | | |
| R3 | | X | | X | | X | | X | | | | |

Fig. 3

DOUBLE-CLUTCH GEARBOX OF COUNTERSHAFT DESIGN

FIELD OF THE INVENTION

The present invention relates generally to a dual-clutch transmission in lay-shaft design.

BACKGROUND

For example, from publication DE 10 2011 088 396 A1, a dual-clutch transmission is known; this features a main group in lay-shaft design with several spur gear stages and shift devices along with a range group in planetary design. The planetary gear set designed as a range group comprises a central sun gear, a ring gear and a planetary gear carrier, which guides the several planetary gears meshing with the sun gear and the ring gear. The sun gear is connected in a torque-proof manner to the end of the main shaft on the output side. The end of the planetary gear carrier on the output side is connected in a torque-proof manner to the output shaft. With the known dual-clutch transmission, the range group is connected downstream of the main group in terms of drive technology, whereas this range group can be switched between two transmission stages, which represent a lower gear range and an upper core range.

SUMMARY OF THE INVENTION

The present subject matter provides a dual-clutch transmission, with which a planetary gear set is not provided as a range group, but is integrated into the gear set in order to be able to realize an improved transmission ratio sequence.

A dual-clutch transmission lay-shaft design with a first input shaft and a second input shaft, which are arranged coaxially at a common input shaft axis, is proposed. Furthermore, a first lay shaft arranged on a first lay-shaft axis and a second lay shaft arranged on a second lay-shaft axis along with at least one planetary gear set are provided. Four gear levels are realized, which form discrete spur gear transmission ratio stages and to which at least nine shift elements are allocated, such that at least eight forward gears and several reverse gears can be shifted. In order to realize a compact design with a minimum of shift elements and good load switching capability, it is provided that the planetary gear set is connected or connectable to one of the input shafts and to one of the gear levels along with the housing, that at least the first forward gear and the second forward gear can be shifted as winding path gears with a simultaneous load switching capability of at least the first three forward gears.

With the planetary gear stage provided with the proposed gear set, for the provided winding path gears, in addition to the use of the gear levels of both sub-transmissions with one gear step, the transmission ratio of the planetary gear set is also used. For example, for the short first forward gear, the transmission ratio of the planetary gear set can be used, while the gearshift is carried out in the second forward gear exclusively by the operation of the dual clutch. Through the connection of the sub-transmission of the second forward gear to the planetary gear carrier of the planetary gear set, the transmission ratio of the planetary gear set is bypassed. The progressive steps between the first forward gear and the second forward gear correspond to the planetary gear set transmission ratio. Since the second gear level is used for the winding of the first and second forward gear as the last stage, the load switching capability between the second forward gear and the third forward gear is also ensured.

In accordance with an advantageous additional exemplary embodiment of the present invention, the connection of the planetary gear set may be varied. For example, the connection of the housing may be effected both at the sun gear and at the ring gear of the planetary gear set. Such different variants are possible through correspondingly positioned shift elements for the gear set in accordance with exemplary aspects of the invention.

Preferably, with the proposed dual-clutch transmission, for example, five double-shift devices or double-shift elements, as the case may be, are provided. However, it has been shown that the gear set of the dual-clutch transmission also manages the task with only four double-shift elements and one single-shift element. With the use of double-shift elements, the number of required operating actuators can be reduced in an advantageous manner. The shift elements or coupling devices, as the case may be, may also be designed as synchronizations. It is conceivable that both positive-locking and frictional-locking shift devices or shift elements, as the case may be, are used. With the provided shift elements, in the activated or switched state, an idler gear (for example) is connected to an allocated shaft, such as a solid shaft or a hollow shaft.

The transmission in accordance with exemplary aspects of the invention may be designed, for example, as a dual-clutch transmission with, for example, a dual clutch, through which the input shaft is connectable to the drive side, for example, to the internal combustion engine or the like. For hybridization, the dual-clutch transmission may be coupled with at least one electric motor.

Moreover, it is also conceivable that, within the framework of a hybrid variant, a dual clutch is omitted by an input shaft of the transmission being connectable to a clutch, and the other input shaft being connectable to an electric motor or the like as load-shifting elements.

If a hybridization is intended with the transmission, the connection of one or more electric motors may be preferably selected such that both the connection of the electric motor to a clutch or to the dual-clutch of the transmission and to the output of the transmission can be shifted, for example, by a shift device. In this manner, both a standing load capability and electric driving without drag losses with the transmission is possible. The connection of the electric motor may be effected at one of the shafts, at a fixed wheel, at an idler gear and/or at an additional fixed gear of the transmission. The preferred connecting location may be the input shaft of the gear set (designed, for example, as a hollow shaft), which is connected to the planetary gear carrier shaft of the planetary gear set.

For example, the electric motor may support shifting operations alone. It is also possible that the internal combustion engine and the electric motor jointly support gearshifts, for example, by an additional planetary transmission or the like. Through the use of an additional double-shift device, the two aforementioned variants can be switched or changed, as the case may be.

BRIEF DESCRIPTION OF THE DRAWINGS

The invention is further described below. The following is shown:

FIG. 3 is a shifting diagram of the transmission in accordance with exemplary aspects of the invention.

DETAILED DESCRIPTION

Figure 1:
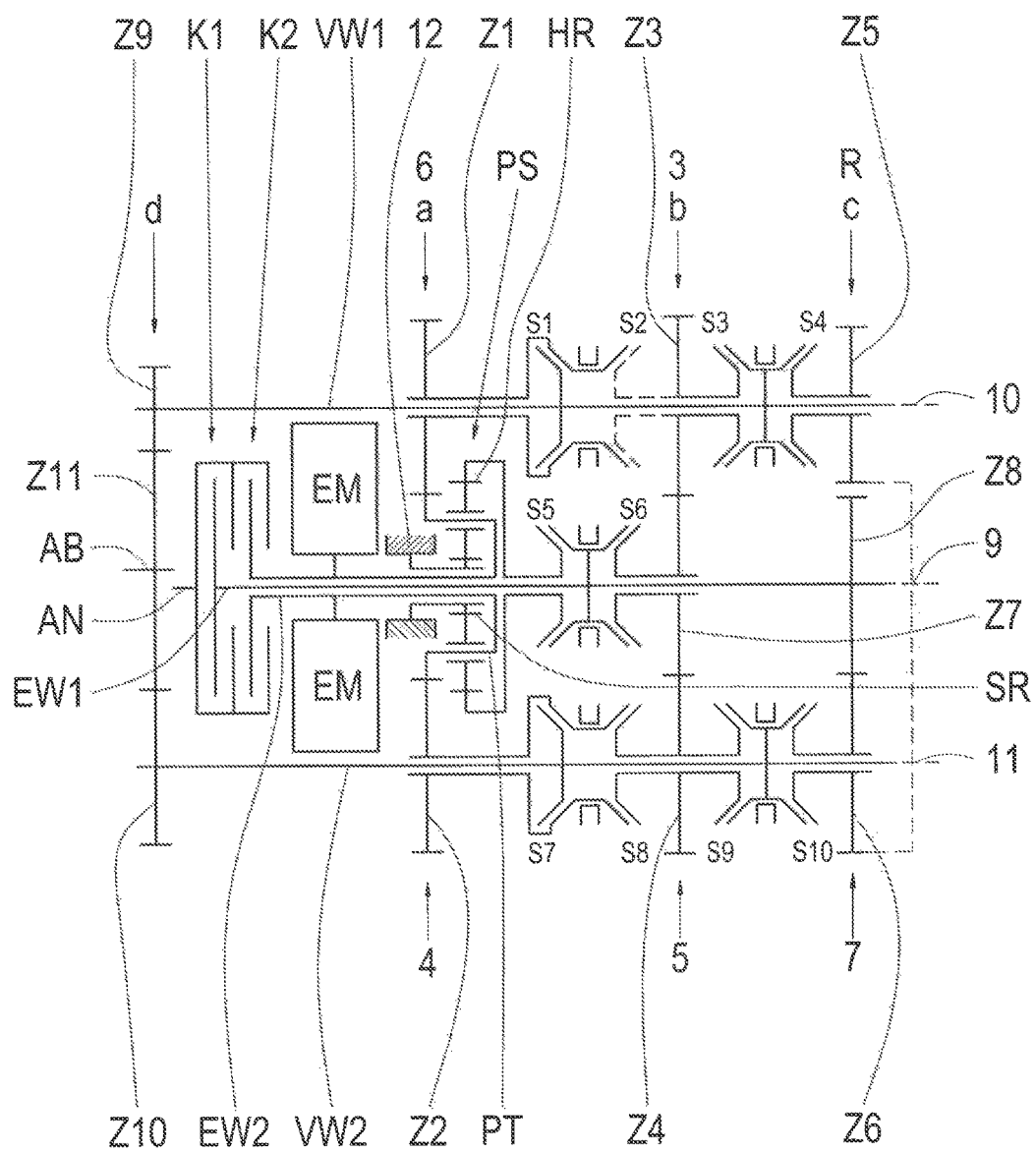
FIG. 1 is a schematic view of an exemplary embodiment of a transmission in accordance with aspects of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows an example of a possible version of a gear set as a dual-clutch transmission. The dual-clutch transmission (for example, for a motor vehicle) comprises a dual clutch with a first clutch K1 and a second clutch K2 as load-shifting elements, the input sides of which are connected to a drive shaft AN and the output sides of which are connected to one of two input shafts EW1, EW2 arranged coaxially at an input shaft axis 9. The first input shaft EW1, which is connected to the first clutch K1, is designed (for example) as a solid shaft, and the second input shaft, which is connected to the second clutch K2, is designed (for example) as a hollow shaft. The sub-transmissions allocated to the two input shafts EW1 and EW2, with the respective spur gear transmission ratio stages, are also interchangeable with each other.

The gear set shown also comprises a first lay shaft VW1, which is arranged coaxially at a first lay-shaft axis 10, and a second lay shaft VW2, which is arranged coaxially at a second lay-shaft axis 11. As a whole, four gear levels a, b, c, d are provided as discrete spur gear transmission ratio stages, to which, in accordance with FIG. 1, ten shift elements S1 S2, S3, S4, S5, S6, S7, S8, S9, S10 and eleven spur gear stages Z1 to Z11 are allocated. With this exemplary embodiment, the shift elements are designed as five double-shift elements S1-S2, S3-S4, S5-S6, S7-S8, and S9-S10. Furthermore, a planetary gear set PS is integrated into the gear set. Thus, at least eight forward gears 1, 2, 3, 4, 5, 6, 7, 8 and three reverse gears R1, R2, R3 can be shifted.

In accordance with exemplary aspects of the invention, the planetary gear set PS is connected or connectable to one of the input shafts EW1, EW2 and to one of the spur gear transmission ratio stages in such a manner that at least the first forward gear 1 and the second forward gear 2 can be shifted as winding path gears with a simultaneous load switching capability of at least the first three forward gears.

With the gear set in accordance with FIG. 1, it is provided that the sun gear SR of the planetary gear set PS is connected to the housing 12, whereas the planetary gear carrier PT of the planetary gear set PS is connected, on the one hand, to the second input shaft EW2 and, on the other hand, to the first gear level a, and whereas the ring gear HR of the planetary gear set PS is connected to the first input shaft EW1.

Furthermore, with the gear set in accordance with FIG. 1, it is provided that the first gear level a comprises the gear wheel Z1 that is formed as an idler gear and is allocated to the first lay-shaft axis 10, and the gear wheel Z2 that is formed as an idler gear and is allocated to the second lay-shaft axis 11, each of which is in mesh with an outer toothing of the planetary gear carrier PT of the planetary gear set PS, in order to realize a connection between the first gear level a and the planetary gear carrier of the planetary gear set PS. The gear wheel Z1 is connectable by the first shift element S1 to the first lay shaft VW1, whereas the gear wheel Z2 is connectable by the seventh shift element S7 to the second lay shaft VW2.

The second gear level b comprises the gear wheel Z3 that is formed as an idler gear and is allocated to the first lay-shaft axis 10, and the gear wheel Z4 that is formed as an idler gear and is allocated to the second lay-shaft axis 11, each of which is in mesh with the gear wheel Z7 of the second gear level b that is formed as an idler gear and is allocated to the input shaft axis 9, whereas the gear wheel Z3 is connectable by the second shift element S2 to the gear wheel Z1 of the first gear level a, or by the third shift element S3 to the first lay shaft VW1. The gear wheel Z4 is connectable by the eighth shift element S8 to the gear wheel Z2 of the first gear level a, or by the ninth shift element S9 to the second lay shaft VW2, whereas the gear wheel Z7 is connectable by the sixth shift element S6 to the first input shaft EW1.

With the gear set shown in FIG. 1, the gear wheels Z3, Z4 of the second gear level b allocated to the lay-shaft axes 10, 11 are connectable by the gear wheel Z7 and by the sixth shift element S6 to the first input shaft EW1. In addition, the gear wheel Z2 of the first gear level a allocated to the second lay-shaft axis 11 is connectable by the seventh shift element S7 to the gear wheel Z4 of the second gear level b. Through this coupling or connection, as the case may be, a temporary hollow shaft is created at the second lay shaft VW2. Furthermore, the gear wheel Z1 of the first gear level a is connectable by the second shift element S2 to the gear wheel Z3 of the second gear level b. Through this connection or coupling, as the case may be, a temporary hollow shaft is created at the first lay shaft VW1. This connection is optional as long as the eighth forward gear 8 is to be designed as a winding path gear in a manner capable of load switching for the seventh forward gear 7.

The third gear level c for realizing the reverse gear comprises the gear wheel Z5 that is formed as an idler gear and is allocated to the first lay-shaft axis 10, the gear wheel Z6 that is formed as an idler gear and is allocated to the second lay-shaft axis 11 and the gear wheel Z8 that is formed as a fixed gear and is allocated to the input shaft axis 9, whereas the gear wheel Z5 is connectable by the fourth shift element S4 to the first lay shaft VW1 and is in mesh with the gear wheel Z6. The gear wheel Z6 is connected by the tenth shift element S10 to the second lay shaft VW2, whereas the gear wheel Z8 connected to the first input shaft EW1 and is in mesh with the gear wheel Z6.

The fourth gear level d comprises, as output constants, the gear wheel Z9 that is formed as a fixed gear and is allocated to the first lay-shaft axis 10, and the gear wheel Z10 that is formed as a fixed gear and is allocated to the second lay-shaft axis 11, each of which is in mesh with the gear wheel Z11 of the fourth gear level d formed as a fixed wheel. The gear wheel Z9 is connected to the first lay shaft VW1, whereas the gear wheel Z10 is connected to the second lay shaft VW2 and whereas the gear wheel Z11 is connected to the output shaft AB.

Furthermore, it can be seen from FIG. 1 that the transmission ratio stages that are used for the different gear stages are designated for individual gear levels a, b, c, d. Accordingly, with the first gear level a, for example, the gear wheel Z1 is provided as the transmission ratio stage for the sixth forward gear 6, and the gear wheel Z2 is provided for the transmission ratio of the fourth forward gear 4. With the second gear level b, the gear wheel Z3 is provided as the transmission ratio stage for the third forward gear 3, and the gear wheel Z4 is provided as the transmission ratio stage for the fifth forward gear 5. Finally, with the third gear level c, the gear wheel Z5 is provided as the transmission ratio stage for the reverse gear R, and the gear wheel Z6 is provided as the transmission ratio stage for the seventh forward gear 7.

The sun gear SR of the planetary gear set PS is connected to the housing 12, whereas the planetary gear carrier PT of the planetary gear set PS, on the one hand, is in mesh with the gear wheel Z1 of the first gear level a and with the gear wheel Z2 of the first gear level a and, on the other hand, is connected to the second input shaft EW2. The ring gear HR of the planetary gear set PS is connectable by the fifth shift element S5 to the first input shaft EW1.

For hybridization, at least one electric motor EM is provided. The electric motor EM is connected to the second input shaft EW2 designed as a hollow shaft and to the planetary carrier shaft.

Figure 2:
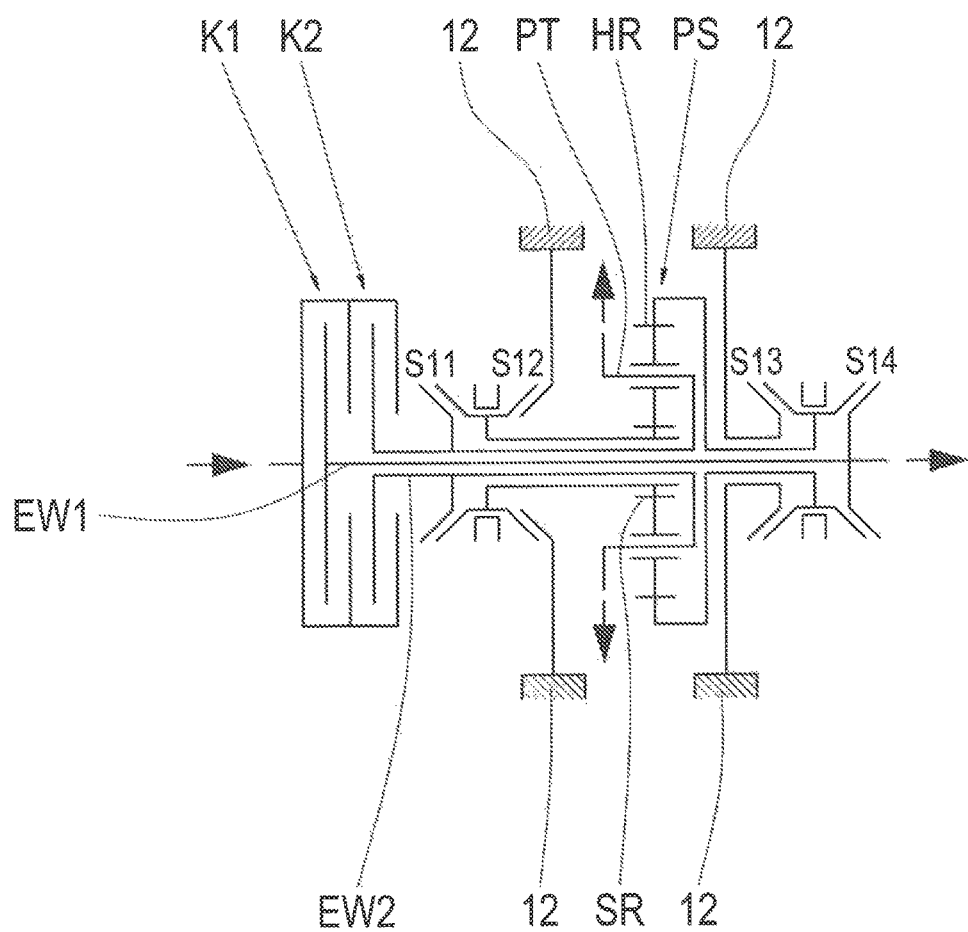
FIG. 2 is a schematic view of different connection variants of a planetary gear set of the transmission in accordance with exemplary aspects of the invention.

By way of example, FIG. 2 shows other connection variants of the planetary gear set PS for the proposed dual-clutch transmission. It is thereby provided that the sun gear SR of the planetary gear set PS is connectable, for example, by an eleventh shift element S11 to one of the input shafts EW1, EW2, preferably to the second input shaft EW2, or by a twelfth shift element S12 to the housing 12. The planetary gear carrier PT of the planetary gear set PS is connected, on one hand, to one of the input shafts EW1, EW2, preferably to the second input shaft EW2, and, on the other hand, to one of the spur gear transmission ratio stages, preferably to the first gear level a. The ring gear HR of the planetary gear set PS is connectable by a thirteenth shift element S13 to the housing 12 or by a fourteenth shift element S14 to one of the input shafts EW1, EW2, preferably to the first input shaft EW1.

Thus, the connection of the housing 12 may be effected, for example. by the sun gear SR and the ring gear HR, which is realized by the positioning of the shift elements.

Through the skilled connection and use of the planetary gear set PS, an advantageous winding of at least the first two forward gears 1, 2, with the simultaneous safeguarding of the load switching capability of the gears 1 through 3, is ensured. The advantage arises from the fact that, for the shortly translated first forward gear 1, the transmission ratio of the planetary gear set PS is used. The gearshift into the second forward gear 2 is carried out exclusively by the operation of the dual clutch. Through the connection of the sub-transmission of the second forward gear 2 to the planetary gear carrier PT of the planetary gear set PS, the transmission ratio of the planetary gear set PS is bypassed. The progressive steps between the first and second forward gears 1, 2 correspond to the planetary gear set transmission ratio. Since the gear wheel Z3 designed as a spur gear is used for the winding of the first and second forward gears 1, 2 as the last stage, the load switching capability for a gearshift from the second forward gear 2 to the third forward gear 3 is ensured.

By way of example, FIG. 3 shows a shifting matrix or a shifting diagram of the proposed dual-clutch transmission, by marking the respectively activated or switched shift elements with an X for each gear stage.

The first forward gear 1 can be shifted, starting from the first clutch K1, by the first input shaft EW1 as a winding path gear, whereas the power flow is transferred, with an activated fifth shift element S5, through the planetary gear set PS and through the first gear level a to the second lay shaft VW2 and, with an activated eighth shift element S8, through the second gear level b, with an activated third shift element S3, to the first lay shaft VW1 and through the fourth gear level d to the output shaft AB. The second forward gear 2 can be shifted, starting from the second clutch K2, by the second input shaft EW2 as a winding path gear, whereas the power flow is transferred through the first gear level a to the second lay shaft VW2 and, with an activated eighth shift element S8, through the second gear level b, with an activated third shift element S3, to the first lay shaft VW1 and through the fourth gear level d to the output shaft AB. The third forward gear 3 can be shifted, starting from the first clutch K1, by the first input shaft EW1, whereas the power flow is transferred, with an activated sixth shift element S6, through the second gear level b, with an activated third shift element S3, to the first lay shaft VW1 and through the fourth gear level d to the output shaft AB. The fourth forward gear 4 can be shifted, starting from the second clutch K2, by the second input shaft EW2, whereas the power flow is transferred through the first gear level a, with an activated seventh shift element S7, to the second lay shaft VW2 and through the fourth gear level d to the output shaft AB. The fifth forward gear 5 can be shifted, starting from the first clutch K1, by the first input shaft EW1, whereas the power flow is transferred, with an activated sixth shift element S6, through the second gear level d, with an activated ninth shift element S9, to the second lay shaft VW2 and through the fourth gear level d to the output shaft AB. The sixth forward gear 6 can be shifted, starting from the second clutch K2, by the second input shaft EW2, whereas the power flow is transferred through the first gear level a, with an activated first shift element S1, to the first lay shaft VW1 and through the fourth gear level d to the output shaft. The seventh forward gear 7 can be shifted, starting from the first clutch K1, by the first input shaft EW1, whereas the power flow is transferred through the third gear level c, with an activated tenth shift element S10, to the second lay shaft VW2 and through the fourth gear level d to the output shaft AB. The eighth forward gear 8, which is capable of load switching for the seventh forward gear 7, can be shifted, starting from the second clutch K2, by the second input shaft EW2 as a winding path gear, whereas the power flow is transferred through the first gear level a and, with an activated second shift element S2, through the second gear level b and, with an activated sixth shift element S6 to the first input shaft EW1 and through the third gear level c, with an activated tenth shift element S10, to the second lay shaft VW2 and through the fourth gear level d to the output shaft AB. The alternative eighth forward gear 8, which is not capable of load switching for the seventh forward gear 7, can be shifted, starting from the first clutch K1, by the first input shaft EW1 as a winding path gear, whereas the power flow is transferred, with an activated sixth shift element S6, through the second gear level b and, with an activated eighth shift element S8, through the first gear level a and, with an activated first shift element S1, to the first lay shaft VW1 and through the fourth gear level d to the output shaft.

The first reverse gear R1 can be shifted, starting from the first clutch K1, by the first input shaft EW1, whereas the power flow is transferred through the third gear level c and, with an activated fourth shift element S4, to the first lay shaft VW1 and through the fourth gear level d to the output shaft AB. The second reverse gear R2 can be shifted, starting from the second clutch K2, by the second input shaft EW2, whereas the power flow is transferred through the first gear level a and, with an activated eighth shift element S8, through the second gear level b and, with an activated sixth shift element S6, to the first input shaft EW1 and through the third gear level c, with an activated fourth shift element S4, to the first lay shaft VW1 and through the fourth gear level d to the output shaft AB. The third reverse gear R3 can be shifted, starting from the second clutch K2, by the second input shaft EW2, whereas the power flow is transferred through the first gear level a and, with an activated second shift element S2, through the second gear level b and, with an activated sixth shift element S6, to the first input shaft EW1 and through the third gear level c, with an activated fourth shift element S4, to the first lay shaft VW1 and through the fourth gear level d to the output shaft AB.

Accordingly, the first reverse gear 1 is wound by the spur gear stages or the transmission ratio stages of the fourth forward gear 4, the fifth forward gear 5, the third forward gear 3 and the first output constant Z9, with the additional use of the planetary gear set transmission ratio. The second forward gear 2 is wound, just as the first forward gear 1, by the aforementioned spur gear stages. However, the planetary gear set transmission ratio is not used by the power flow being passed directly from the input shaft EW2 by the planetary gear carrier shaft to the spur gear stage of the fourth forward gear 4. The eighth forward gear 8 is wound by the spur gear stages or transmission ratio stages of the fifth forward gear 5, the fourth forward gear 4, the sixth forward gear 6 and the first output constant Z9 of the fourth gear level. This leads to a gearshift under an interrupted pulling force between the seventh forward gear 7 and the eighth forward gear 8. Optionally, the eighth forward gear 8 is wound by the spur gear stages of the sixth forward gear, the third forward gear 3, the seventh forward gear 7 and the second output constant Z10 of the fourth gear level d. This winding ensures the load switching capability of the seventh forward gear 7.

In summary, a compact main gear set with only four gear levels and one planetary gear stage is proposed, with which a minimum number of shift elements and a high degree of shift element packaging is ensured. In addition to the very good load switching capability, a good ability to hybridize arises. Through the provided winding path gears, the mechanical spread caused by the winding of the bordering gears is reduced. Furthermore, a reduction in differential rotational speeds arises through virtual gears with smaller storage and churning losses. In addition, the compact design gives rise to a reduction in axle spacings.

Modifications and variations can be made to the embodiments illustrated or described herein without departing from the scope and spirit of the invention as set forth in the appended claims.

REFERENCE SIGNS

1 First forward gear
2 Second forward gear
3 Third forward gear
4 Fourth forward gear
5 Fifth forward gear
6 Sixth forward gear
7 Seventh forward gear
8 Eighth forward gear
9 Input shaft axis or main axis
10 First lay-shaft axis
11 Second lay-shaft axis
R1 Reverse gear
R2 Reverse gear
R3 Reverse gear
AN Drive shaft
AB Output shaft
K1 First clutch
K2 Second clutch
S1 First shift element
S2 Second shift element
S3 Third shift element
S4 Fourth shift element
S5 Fifth shift element
S6 Sixth shift element
S7 Seventh shift element
S8 Eight shift element
S9 Ninth shift element
S10 Tenth shift element
S11 Eleventh shift element
S12 Twelfth shift element
S13 Thirteenth shift element
S14 Fourteenth shift element
EM Electric motor
EW1 First input shaft
EW2 Second input shaft
VW1 First lay shaft
VW2 Second lay shaft
a First gear level
b Second gear level
c Third gear level
d Fourth gear level with output constants
Z1 Gear wheel of the first gear level
Z2 Gear wheel of the first gear level
Z3 Gear wheel of the second gear level
Z4 Gear wheel of the second gear level
Z5 Gear wheel of the third gear level
Z6 Gear wheel of the third gear level
Z7 Gear wheel of the second gear level
Z8 Gear wheel of the third gear level
Z9 Gear wheel of the fourth gear level
Z10 Gear wheel of the fourth gear level
Z11 Gear wheel of the fourth gear level
PS Planetary gear set
SR Sun gear
PT Planetary carrier
HR Ring gear

The invention claimed is:

1. A dual-clutch transmission, comprising:
a first input shaft arranged coaxially at a common input shaft axis;
a second input shaft arranged coaxially at the common input shaft axis;
a first lay shaft arranged coaxially on a first lay-shaft axis;
a second lay shaft arranged coaxially on a second lay-shaft axis;
at least one planetary gear set;
four gear levels which with the at least one planetary gear set form discrete spur gear transmission ratio stages; and
at least nine shift elements allocated such that at least eight forward gears and a plurality of reverse gears are shiftable,
wherein the at least one planetary gear set is connected or connectable to one of the first and second input shafts and to one of the four gear levels along with a housing such that at least a first forward gear and a second forward gear of the at least eight forward gears is shiftable with power flow through both the first lay shaft and the second lay shaft and with a simultaneous load switching capability in at least the first three forward gears of the at least eight forward gears.

2. The dual-clutch transmission of claim 1, wherein:
a sun gear of the planetary gear set is connectable by a first one of the at least nine shift elements to one of the first and second input shafts or by a second one of the at least nine shift elements to the housing;
a carrier of the planetary gear set is connected to one of the first and second input shafts and to the one of the four gear levels; and
a ring gear of the planetary gear set is connectable by a third one of the at least nine shift elements to the housing or by a fourth one of the at least nine shift elements to one of the first and second input shafts.

3. The dual-clutch transmission of claim 1, wherein:
a sun gear of the planetary gear set is connected to the housing;
a carrier of the planetary gear set is connected to the second input shaft and to a first gear level of the four gear levels; and
a ring gear of the planetary gear set is connected to the first input shaft.

4. The dual-clutch transmission of claim 3, wherein the carrier of the planetary gear set has an outer toothing that meshes with gear wheels of the first gear level.

5. The dual-clutch transmission of claim 3, wherein:
a first gear wheel of the first gear level is an idler gear;
a second gear wheel the first gear level is also an idler gear;
the first and second gear wheels of the first gear level mesh with an outer toothing of the carrier of the planetary gear set;
the first gear wheel is connectable to the first lay shaft by a first one of the at least nine shift elements; and
the second gear wheel is connectable to the second lay shaft by a second one of the at least nine shift elements.

6. The dual-clutch transmission of claim 1, wherein:
a first gear wheel of the second gear level is an idler gear;
a second gear wheel the second gear level is also an idler gear;
a third gear wheel the second gear level is also an idler gear;
the first and second gear wheels of the second gear level mesh with the third gear wheel of the second gear level;
the first gear wheel of the second gear level is connectable to the first lay shaft by a first one of the at least nine shift elements;
the second gear wheel of the second gear level is connectable to the second lay shaft by a second one of the at least nine shift elements; and
the third gear wheel of the second gear level is connectable to the first input shaft by a third one of the at least nine shift elements.

7. The dual-clutch transmission of claim 6, wherein the first and second gear wheels of the second gear level are connectable by the third gear wheel of the second gear level and by the third one of the at least nine shift elements to the first input shaft.

8. The dual-clutch transmission of claim 6, wherein the second gear wheel of the first gear level is connectable to the second gear wheel of the second gear level by a fourth one of the at least nine shift elements.

9. The dual-clutch transmission of claim 6, wherein the first gear wheel of the first gear level is connectable to the first gear wheel of the second gear level by a fourth one of the at least nine shift elements.

10. The dual-clutch transmission of claim 1, wherein:
a third gear level of the four gear levels comprises a first gear wheel, a second gear wheel and a third gear wheel;
the first and second gear wheels of the third gear level are idler gears;
the third gear wheel of the third gear level is a fixed gear;
the first gear wheel of the third gear level is connectable to the first lay shaft by a first one of the at least nine shift elements;
the first gear wheel of the third gear level is in mesh with the second gear wheel of the third gear level;
the second gear wheel of the third gear level is connectable to the second lay shaft by a second one of the at least nine shift elements;
the third gear wheel of the third gear level is connected to the first input shaft; and
the third gear wheel of the third gear level is in mesh with the second gear wheel of the third gear level.

11. The dual-clutch transmission of claim 1, wherein:
the fourth gear level comprises a first gear wheel, a second gear wheel and a third gear wheel;
the first and second gear wheels of the fourth gear level are fixed gears;
the third gear wheel of the fourth gear level is a fixed wheel;
the first and second gear wheels of the fourth gear level are in mesh with the third gear wheel of the fourth gear level;
the first gear wheel of the fourth gear level is connected to the first lay shaft;
the second gear wheel of the fourth gear level is connected to the second lay shaft; and
the third gear wheel of the fourth gear level is connected to an output shaft.

12. The dual-clutch transmission of claim 1, wherein:
a sun gear of the planetary gear set is connected to the housing;
a carrier of the planetary gear set is in mesh with a first gear wheel of the first gear level and with a second gear wheel of the first gear level;
the carrier of the planetary gear set is connected to the second input shaft; and
a ring gear of the planetary gear set is connectable to the first input shaft by a first one of the at least nine shift elements.

13. The dual-clutch transmission of claim 1, wherein the dual-clutch transmission is a hybrid dual-clutch transmission and further comprises an electric motor.

14. The dual-clutch transmission of claim 13, wherein the electric motor is connected to the second input shaft.

* * * * *